(12) United States Patent
Foy et al.

(10) Patent No.: US 10,386,571 B1
(45) Date of Patent: Aug. 20, 2019

(54) APPARATUS FOR COUPLING LIGHT INTO LIGHTGUIDES

(71) Applicants: Adam Moore Foy, Parker, CO (US);
Eric T. DiFelice, Aurora, CO (US);
Alexander James Ross, Aurora, CO (US)

(72) Inventors: Adam Moore Foy, Parker, CO (US);
Eric T. DiFelice, Aurora, CO (US);
Alexander James Ross, Aurora, CO (US)

(73) Assignee: Cooper Technologies Company, Houston, TX (US)

( * ) Notice: Subject to any disclaimer, the term of this patent is extended or adjusted under 35 U.S.C. 154(b) by 13 days.

(21) Appl. No.: 15/055,430

(22) Filed: Feb. 26, 2016

Related U.S. Application Data

(60) Provisional application No. 62/121,285, filed on Feb. 26, 2015.

(51) Int. Cl.
*F21V 8/00* (2006.01)

(52) U.S. Cl.
CPC ......... *G02B 6/0076* (2013.01); *G02B 6/0025* (2013.01); *G02B 6/0028* (2013.01); *G02B 6/0088* (2013.01)

(58) Field of Classification Search
CPC ... G02B 6/0076; G02B 6/0025; G02B 6/0028
See application file for complete search history.

(56) References Cited

U.S. PATENT DOCUMENTS

| | | |
|---|---|---|
| D124,602 S | 9/1940 | Dreyfuss |
| D394,727 S | 5/1998 | Larkin |
| D565,778 S | 4/2008 | Pedersen |
| D616,138 S | 5/2010 | Lasthein et al. |
| D632,823 S | 2/2011 | Kong et al. |
| D671,258 S | 11/2012 | Ferrier et al. |
| D703,361 S | 4/2014 | Kondou et al. |
| D704,878 S | 5/2014 | Wilson et al. |
| D716,489 S | 10/2014 | O'Leary et al. |
| D810,348 S | 2/2018 | Garrett |

(Continued)

OTHER PUBLICATIONS

LEDs magazine article "Eaton delivers curved LED-lit.scheme". Published Mar. 15, 2017. (6 pages).

*Primary Examiner* — Jong-Suk (James) Lee
*Assistant Examiner* — Christopher E Dunay
(74) *Attorney, Agent, or Firm* — King & Spalding LLP

(57) ABSTRACT

A system of light emitting diodes and lightguides can produce and distribute light in a luminaire. Two or more lightguides can be mounted adjacent one another so that their edges extend alongside one another. An optic can couple light between the light emitting diodes and the edges of the adjacent lightguides. The optic, which can be another lightguide in some examples, can mix, blend, or homogenize light received from the light emitting diodes and distribute the light among the adjacent lightguides. The optic can mix light emitted from multiple light emitting diodes so that light enters the adjacent lightguides uniformly along the edges of the lightguide, thereby eliminating or reducing any bright spots or visual inconsistencies. The optic can further allocate light uniformly among the adjacent lightguides.

14 Claims, 9 Drawing Sheets

(56) References Cited

U.S. PATENT DOCUMENTS

| | | | |
|---|---|---|---|
| 2011/0007518 A1* | 1/2011 | de Lamberterie | B60Q 1/2607 |
| | | | 362/511 |
| 2012/0069600 A1* | 3/2012 | Lin | B29D 11/00663 |
| | | | 362/616 |
| 2012/0169967 A1* | 7/2012 | Han | G02F 1/1333 |
| | | | 349/62 |
| 2012/0328242 A1* | 12/2012 | Hesse | G02B 6/0018 |
| | | | 385/36 |
| 2013/0050584 A1* | 2/2013 | Kaihotsu | G09G 3/3406 |
| | | | 348/731 |
| 2013/0077341 A1* | 3/2013 | Kawai | G09F 7/08 |
| | | | 362/602 |
| 2013/0208495 A1 | 8/2013 | Dau et al. | |
| 2014/0340867 A1* | 11/2014 | Kobayashi | F21V 33/0052 |
| | | | 362/23.16 |
| 2014/0347885 A1 | 11/2014 | Wilcox et al. | |
| 2015/0138829 A1 | 5/2015 | Jang | |
| 2015/0168626 A1* | 6/2015 | Schinagl | G02B 6/0006 |
| | | | 362/555 |
| 2015/0177439 A1 | 6/2015 | Durkee et al. | |
| 2016/0161659 A1* | 6/2016 | Minami | G02B 6/0031 |
| 2017/0159913 A1* | 6/2017 | Horvath | F21V 14/04 |
| 2018/0031217 A1 | 2/2018 | Tuchler | |
| 2018/0163947 A1 | 6/2018 | Kim | |
| 2018/0172246 A1 | 6/2018 | Walker | |

\* cited by examiner

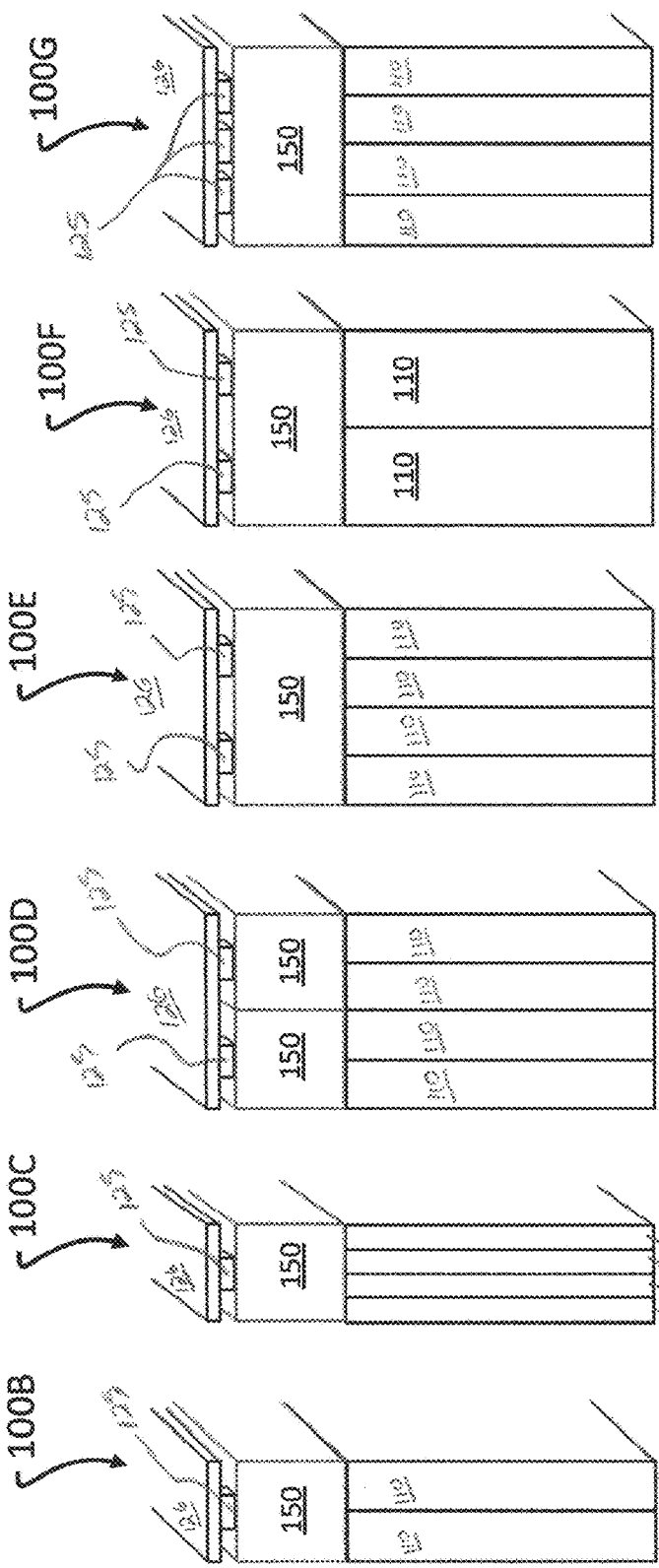

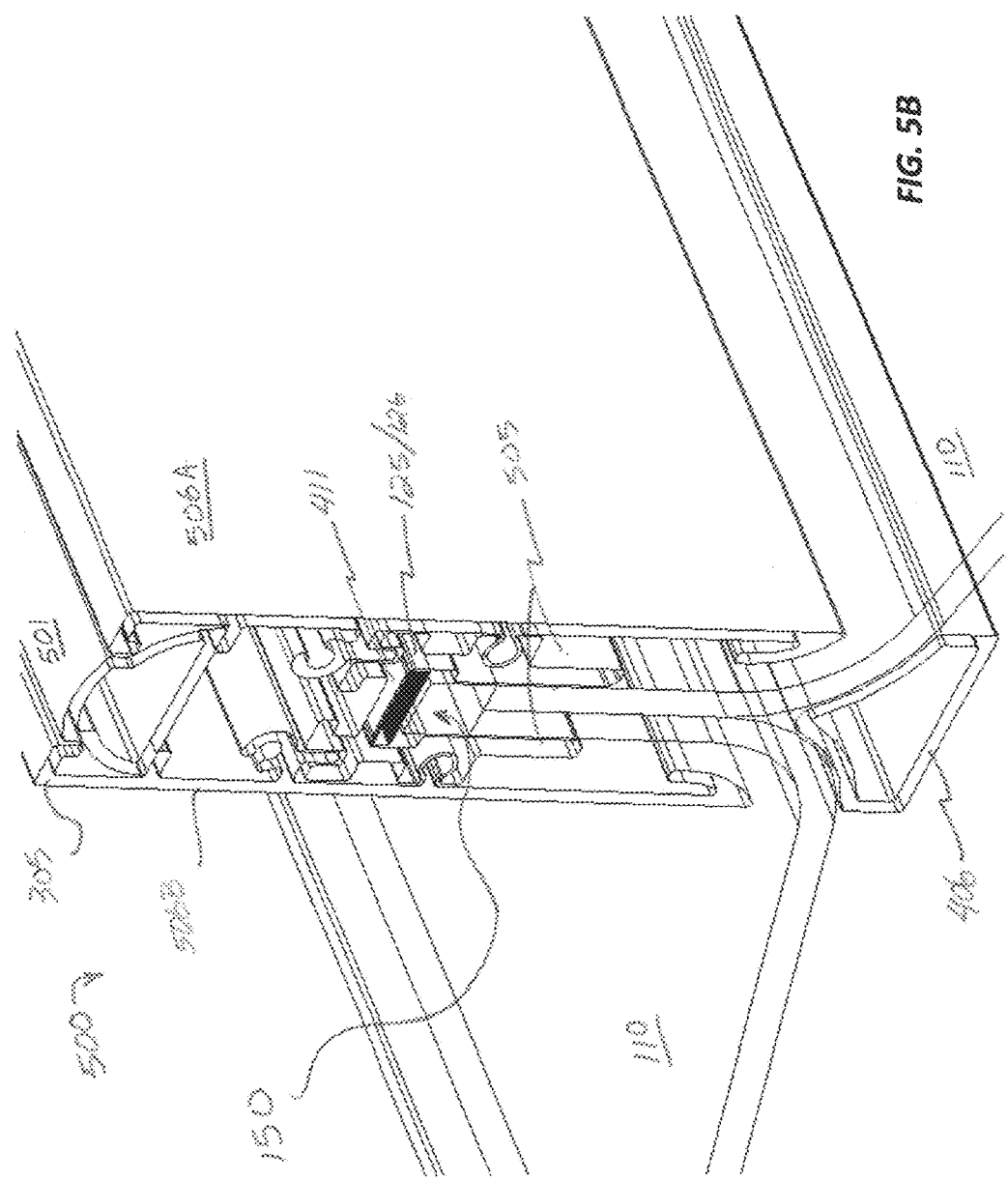

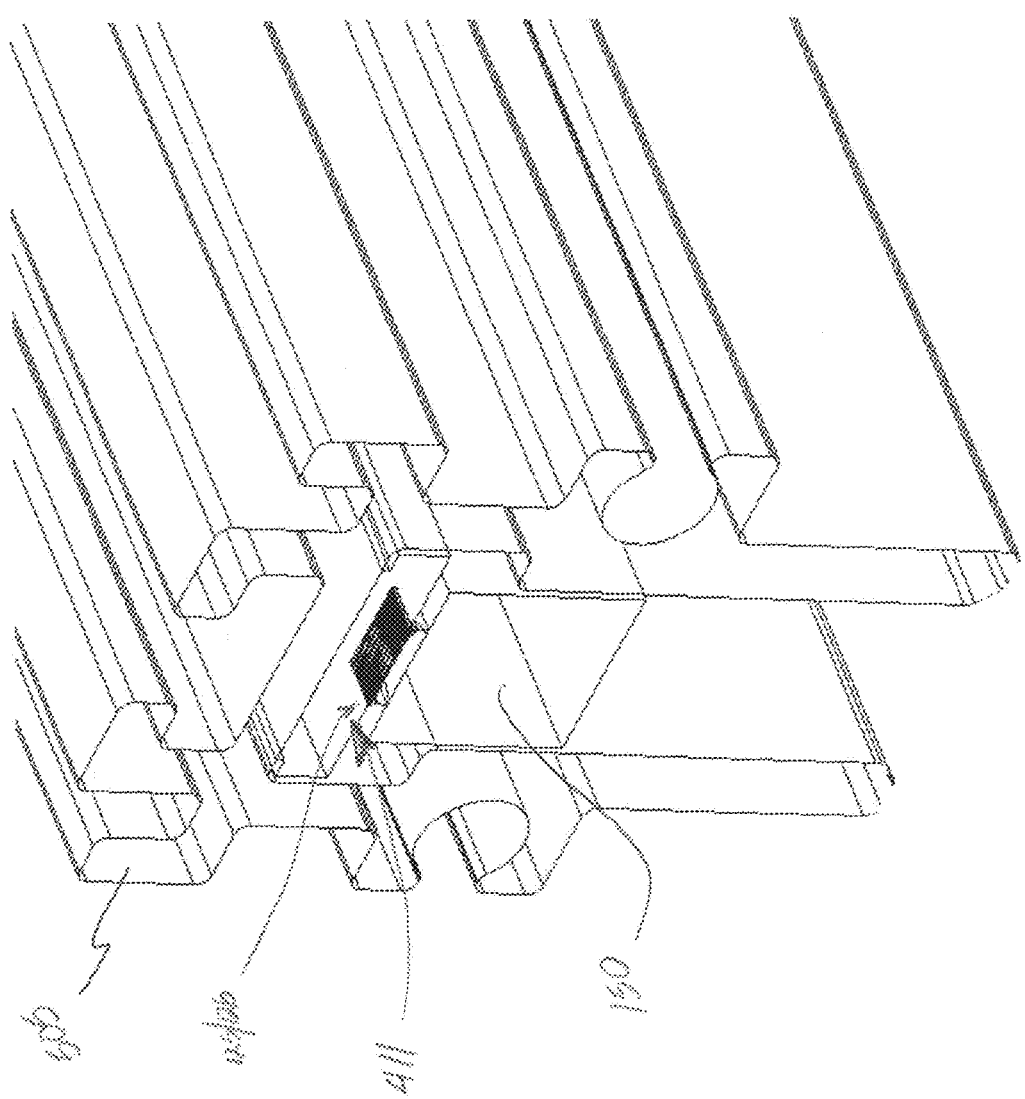

APPARATUS FOR COUPLING LIGHT INTO LIGHTGUIDES

CROSS REFERENCE TO RELATED APPLICATIONS

This application claims priority to U.S. Provisional Patent Application No. 62/121,285 filed Feb. 26, 2015 in the name of Adam Moore Foy, Eric T. DiFelice, and Alexander James Ross and entitled "Apparatus for Coupling Light into Lightguides," the entire contents of which are hereby incorporated herein by reference.

TECHNICAL FIELD

Embodiments of the technology relate generally to illumination systems and more particularly to an optic that couples light from light emitting diodes into lightguides.

BACKGROUND

As compared to incandescent and fluorescent light sources, light emitting diodes (LEDs) offer substantial potential benefit associated with their energy efficiency, light quality, and compact size. However, to realize the full potential benefits offered by light emitting diodes, new technologies are needed.

For instance, there are needs in the art for technology to utilize light emitting diodes for illumination. Need exists for light-emitting-diode-based systems that can evenly distribute light produced by one or more light emitting diodes. Need further exists for technology to mix or homogenize light from one or more light emitting diodes to provide illumination. Need exists for technology to couple light from light emitting diodes into edgelit lightguides for illumination. A capability addressing one or more such needs, or some other related deficiency in the art, would support improved illumination and more widespread utilization of light emitting diodes in lighting applications.

SUMMARY

In an aspect of the disclosure, a lighting system can comprise one or more lightguides, one or more light emitting diodes ("LEDs"), and an optic. The optic can couple light from the light emitting diode(s) to the lightguide(s).

In some aspects of the disclosure, the optic can mix or otherwise manage light emitted from the light emitting diode or diodes so that light enters each lightguide uniformly along edges of the lightguide, thereby eliminating or reducing any bright spots or visual inconsistencies in the lightguide. The optic can further allocate or apportion the light appropriately between or among multiple lightguides, for example even when the light emitting diodes are not well centered between two or more lightguides. Thus, the optic can compensate for misalignment between a light emitting diode and one or more lightguides.

In some aspects of the disclosure, the optic can further homogenize the light emitted from one or more light emitting diodes, so that color or chromaticity of coupled light and the resulting illumination is spatially uniform. Thus, the optic can compensate for a light emitting diode that emits a pattern of light having different colors in different areas of the pattern.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will be made below to the accompanying drawings.

FIGS. 2A, 2B, 2C, 2D, 2E, 2F, and 2G (collectively FIG. 2) are illustrations of example optical configurations that may be comprised in lighting systems, such as the one illustrated in FIG. 1 in accordance with some embodiments of the disclosure.

FIGS. 5A and 5B, and 5C (collectively FIG. 5) are illustrations of another example luminaire that may comprise a lighting system as illustrated in FIGS. 1 and 2 in accordance with some embodiments of the disclosure.

Figure 1:
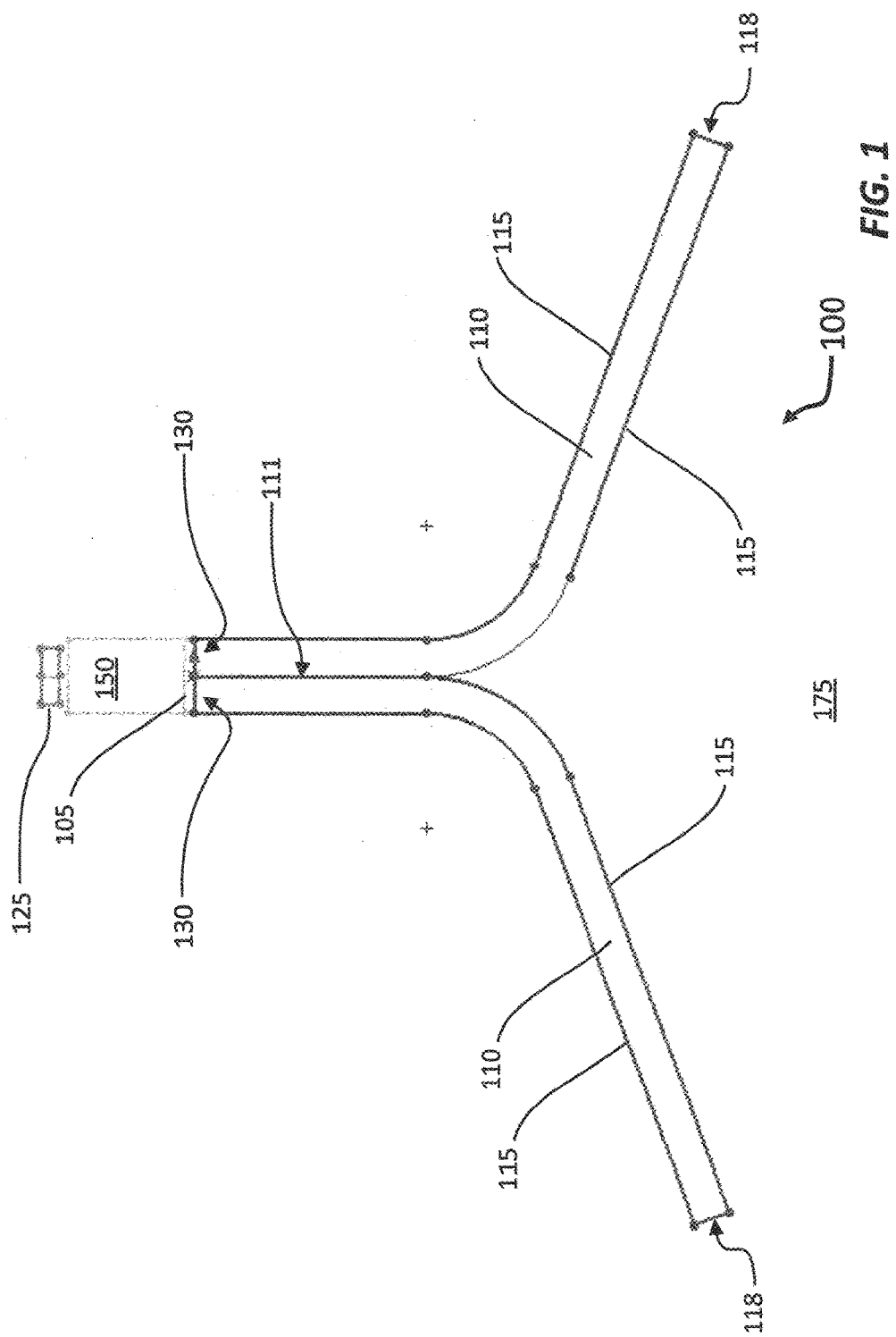
FIG. 1 is an illustration of an example lighting system in accordance with some embodiments of the disclosure.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

A lightguide can comprise a panel, slab, plate, or related form that comprises two major faces that are internally reflective. Light can be introduced into the lightguide from a first edge of the lightguide, so that the major faces guide the light towards a second edge. The major faces can provide a controlled release of light flowing through the lightguide, to illuminate an area. Light can thus propagate in the lightguide via internal reflection from the two major faces, traveling from the light-source edge towards an opposing edge, and illumination light can escape from the lightguide through the major faces and the opposing edge.

A light source can be positioned adjacent the first edge of the lightguide, so that the light source emits light into the lightguide via the first edge. An optic disposed between the light source and the first edge of the lightguide can couple light into the lightguide. The optic can diffuse, mix, spread, homogenize, allocate, apportion, or otherwise manage the light, to improve transfer of the light between the light source and the lightguide.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 2A:
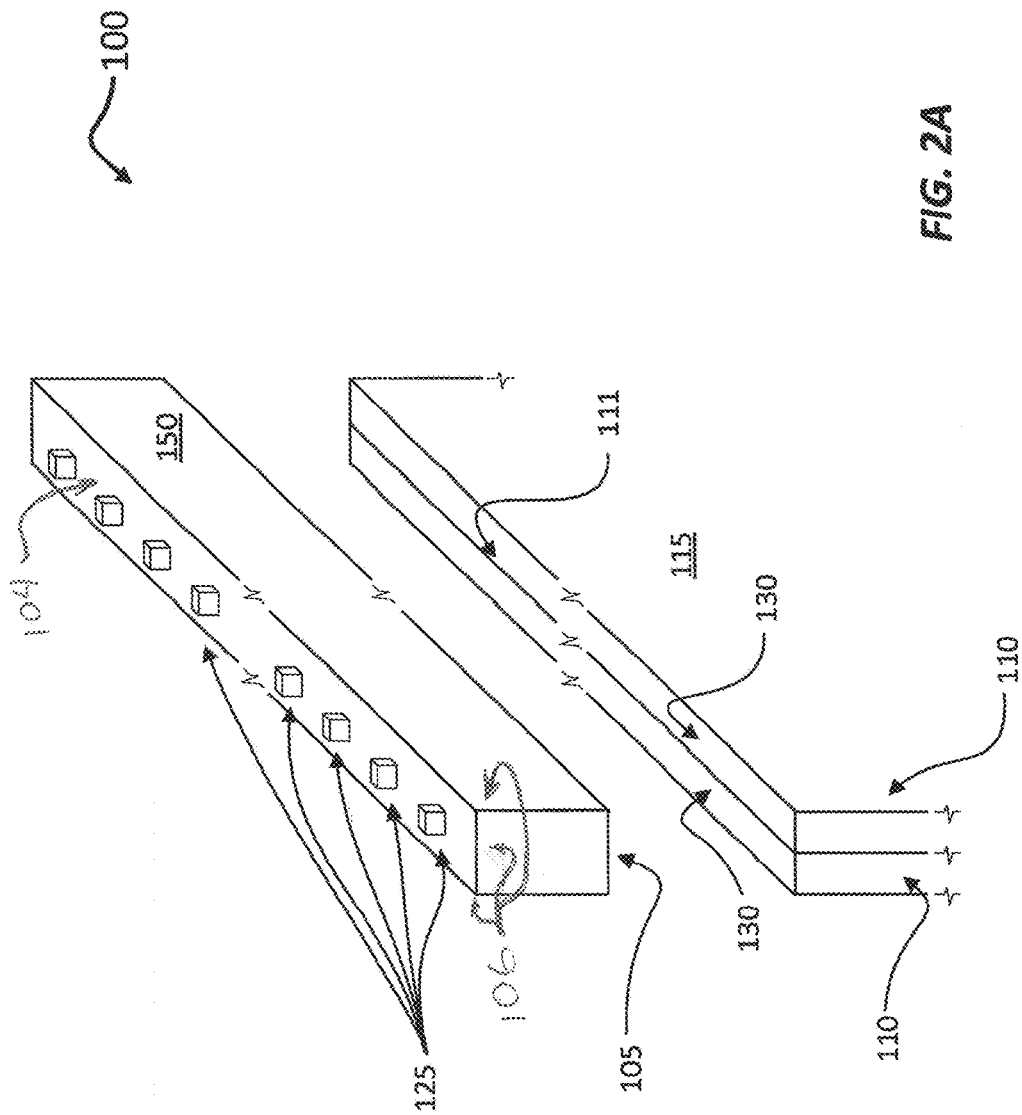

Referring now to FIGS. 1 and 2A, an example lighting system 100 is illustrated in accordance with some embodiments of the disclosure. FIG. 1 illustrates a side view of the lighting system 100, showing an example optical configuration. FIG. 2A illustrates a line drawing providing a partially exploded, perspective view of the lighting system 100. FIGS. 2B, 2C, 2D, 2E, 2F, and 2G illustrate some other example lighting system configurations and will be discussed in further detail below.

In the example lighting system 100 illustrated in FIGS. 1 and 2A, an array of light emitting diodes (LEDs) 125 emits light into an optic 150 through an entrance face 104 of the optic 150. The optic 150 couples the light into two lightguides 110 via the lightguide edges 130, two being merely an example number of lightguides. The major faces 115 of each lightguide 110 guide the coupled light generally towards the opposing lightguide edges 118. As illustrated, the lightguides 110 can be viewed as lightguide panels or as edgelit panels.

The major faces 115 of the lightguide 110 can be patterned with microlenses that promote controlled release of light internally incident on those faces 115. The resulting light can provide beneficial illumination for an area 175 that may be occupied by one or more people, for example.

In some embodiments, only the upper major faces 115 are so patterned. In some embodiments, only the lower major faces 115 are so patterned. In some example embodiments, all the major faces 115 are so patterned. The microlenses can comprise conical features, truncated cones, convex shapes, or other appropriate features, for example. In some embodiments, the major faces 115 of the lightguide 110 are unpatterned so that, relative to a microlensed embodiment, less light escapes through the major faces 115, and thus more light reaches the lightguide edges 118.

In the illustrated embodiment of FIGS. 1 and 2A, the optic 150 comprises an elongated piece of optical material, for example a bar of clear plastic. In some embodiments, the optic 150 comprises a lightguide. In an example embodiment, the thickness of the optic 150 is approximately twice the thickness of one of the lightguides 110. As further discussed below, the optic 150 can mix and diffuse light passing through the optic 150, thereby suppressing any hotspots and enhancing light distribution.

In some example embodiments, the optic 150 comprises an exit face 105 having a surface pattern or patterned surface that diffuses light as the light transmits through that surface. The exit face 105 can be roughed up via sand paper, embossing, molding, or bead blasting, for example. The side faces 106 of the optic 150 can be polished to promote total internal reflection of light propagating between the entrance face 104 and the exit face 105. The side faces 106 of the optic 150 can comprise totally internally reflective surfaces.

In some example embodiments, the optic 150 comprises one or more refractive surfaces that spreads, concentrates, focuses, diverges, or otherwise manipulates light. In some example embodiments, the optic 150 comprises embedded particles or materials that scatter light propagating through the optic 150. Such particles can be concentrated or layered at the exit face 105, for example.

In some embodiments, the optic 150 can be fabricated by co-extrusion of two optical materials, one having more scattering agent than the other. For example, the optic 150 can comprise a main body of clear optical material and one or more strips of diffusing material extending lengthwise, for example along the exit face 105 of the optic 150.

In some embodiments, a layer of diffuser material is added along the exit face 105 by means other than co-extrusion. For example, one or more diffusion layers can be bonded to a main body utilizing heat, welding, adhesive, or other appropriate bonding or fusion means.

In some embodiments, the optic 150 comprises a scattering agent that is homogenously distributed throughout the optic 150.

In some example embodiments, the optic 150 comprises a plastic optical material such as PMMA acrylic, polystyrene, or optical grade polycarbonate, to mention a few representative examples without limitation. In some example embodiments, the optic 150 comprises silicone or another appropriate elastomer. In some example embodiments, such optical materials may be clear. In some example embodiments, such optical materials may comprise scattering additives, fine particles, or a diffusion agent. In some example embodiments, the optic 150 comprises a mixture or blend of multiple polymers, such as 85% acrylic and 15% high impact acrylic.

In some example embodiments, an air gap exists between the exit face 105 of the optic 150 and the lightguide edges 130. In some example embodiments, the optic 150 can be fixed to the lightguide edges 130 via adhesive, heat-induced fusion, welding, or other appropriate bonding technology.

In the illustrated embodiment of FIGS. 1 and 2A, the lightguides 110 extend beside one another near the lightguide edges 130 and then diverge or splay out towards the lightguide edges 118. The area where the lightguides 110 extend beside one another or meet can comprise a joint 111. In some embodiments, the lightguides 110 are bonded together at the joint 111. In some embodiments, the lightguides 110 contact one another at the joint 111 without fusion or other bonding. In some embodiments, light transfers between the two lightguides 110 through the joint 111. In some example embodiments, such contact is intermittent. In some embodiments, such contact occurs in portions of the joint 111, while other areas of the joint 111 have a small gap between the two lightguides 110. In some example embodiments, an air gap exists between the two lightguides 110, so there is little or no direct physical contact.

While the illustrated embodiment of the lighting system 100 has two lightguides 110, other embodiments may have a single lightguide. As discussed in further detail below with reference to FIGS. 2B, 2C, 2D, 2E, 2F, and 2G, still other embodiments may incorporate three, or four, or five, or more lightguides that adjoin, or may be joined together, and diverge away from one another.

As illustrated in FIGS. 1 and 2A, the light emitting diodes 125 are arranged in a row that extends along the joint 111, with the optic 150 between the light emitting diodes 125 and the joint 111. In this arrangement, the optic 150 can compensate for misalignment between the light emitting diodes 125 and the joint 111. The optic 150 allocates or apportions the light substantially equally between the two lightguides 110, even if the light emitting diodes 125 are misaligned with the joint 111. In other words, the light emitting diodes 125 need not be exactly centered between the two lightguide 110. Accordingly, manufacturing tolerances can be relaxed.

In some embodiments, each of the light emitting diodes 125 has a surface that emits light with a chromaticity that varies across the emission pattern. For example, peripheral areas of the emitted light (and thus of the LED surface as light is emitted) can exhibit a yellow hue, even though the overall emission is white. The optic 150 can blend or mix the overall emission pattern to provide an output light having a more consistent or uniform chromaticity.

In some embodiments, the light emitting diodes 125 can produce optical hotspots if coupled directly to the edges 130 of the lightguides 110. In other words, without the optic 150, a person looking at a major face 115 may see bright spots in a lightguide 100 or in illumination emitted by a lightguide 110. The optic 150 can distribute and combine the light from the row of light emitting diodes 125 to soften or eliminate such bright spots, thereby increasing illumination quality.

Turning now to FIGS. 2B, 2C, 2D, 2E, 2F, and 2G, some other example optical system configurations are illustrated that may be substituted for the optical system 100 illustrated in FIGS. 1 and 2A. The illustrated optical systems are representative and among others supported by the present disclosure.

The optical system 100B illustrated in FIG. 2B comprises a circuit board 126 that extends lengthwise. A lengthwise extending row of light emitting diodes 125 is mounted to the circuit board 126. An optic 150, which also extends lengthwise, is positioned to receive light from the row of light emitting diodes 125 and to couple the received light into two lengthwise-extending lightguides 110. In some example embodiments, the lightguides 110 may splay out as illustrated in FIG. 1.

The optical system 100C illustrated in FIG. 2C also comprises a circuit board 126 that extends lengthwise. A lengthwise extending row of light emitting diodes 125 is mounted to the circuit board 126. An optic 150, which also extends lengthwise, is positioned to receive light from the row of light emitting diodes 125 and to couple the received light into four lengthwise-extending lightguides 110. In some example embodiments, the lightguides 110 may splay out (see FIG. 1, for example).

The optical system 100D illustrated in FIG. 2D comprises a circuit board 126 that extends lengthwise. Two lengthwise extending rows of light emitting diodes 125 are mounted to the circuit board 126. Two optics 150, which also extend lengthwise, are positioned to receive light from the rows of light emitting diodes 125 and to couple the received light into four lengthwise-extending lightguides 110. In the illustrated embodiment, each optic 150 couples light primarily into two of the four lightguides 110. In some example embodiments, the lightguides 110 may splay out (see FIG. 1, for example).

The optical system 100E illustrated in FIG. 2E comprises a circuit board 126 that extends lengthwise. Two lengthwise extending rows of light emitting diodes 125 are mounted to the circuit board 126. One optic 150, which also extends lengthwise, is positioned to receive light from the two rows of light emitting diodes 125 and to couple the received light into four lengthwise-extending lightguides 110. In some example embodiments, the lightguides 110 may splay out (see FIG. 1, for example).

The optical system 100F illustrated in FIG. 2F comprises a circuit board 126 that extends lengthwise. Two lengthwise extending rows of light emitting diodes 125 are mounted to the circuit board 126. One optic 150, which also extends lengthwise, is positioned to receive light from the two rows of light emitting diodes 125 and to couple the received light into two lengthwise-extending lightguides 110. In some example embodiments, the lightguides 110 may splay out (see FIG. 1, for example).

The optical system 100G illustrated in FIG. 2G comprises a circuit board 126 that extends lengthwise. Three lengthwise extending rows of light emitting diodes 125 are mounted to the circuit board 126. An optic 150, which also extends lengthwise, is positioned to receive light from the three rows of light emitting diodes 125 and to couple the received light into four lengthwise-extending lightguides 110. In some example embodiments, the lightguides 110 may splay out (see FIG. 1, for example).

The embodiments illustrated in FIGS. 2A, 2B, 2C, 2D, 2E, 2F, and 2G are examples. Other embodiments may have different configurations, for example different numbers of rows of light emitting diodes 125, different numbers of lightguides 110, and different numbers of optics 150.

Figure 3:
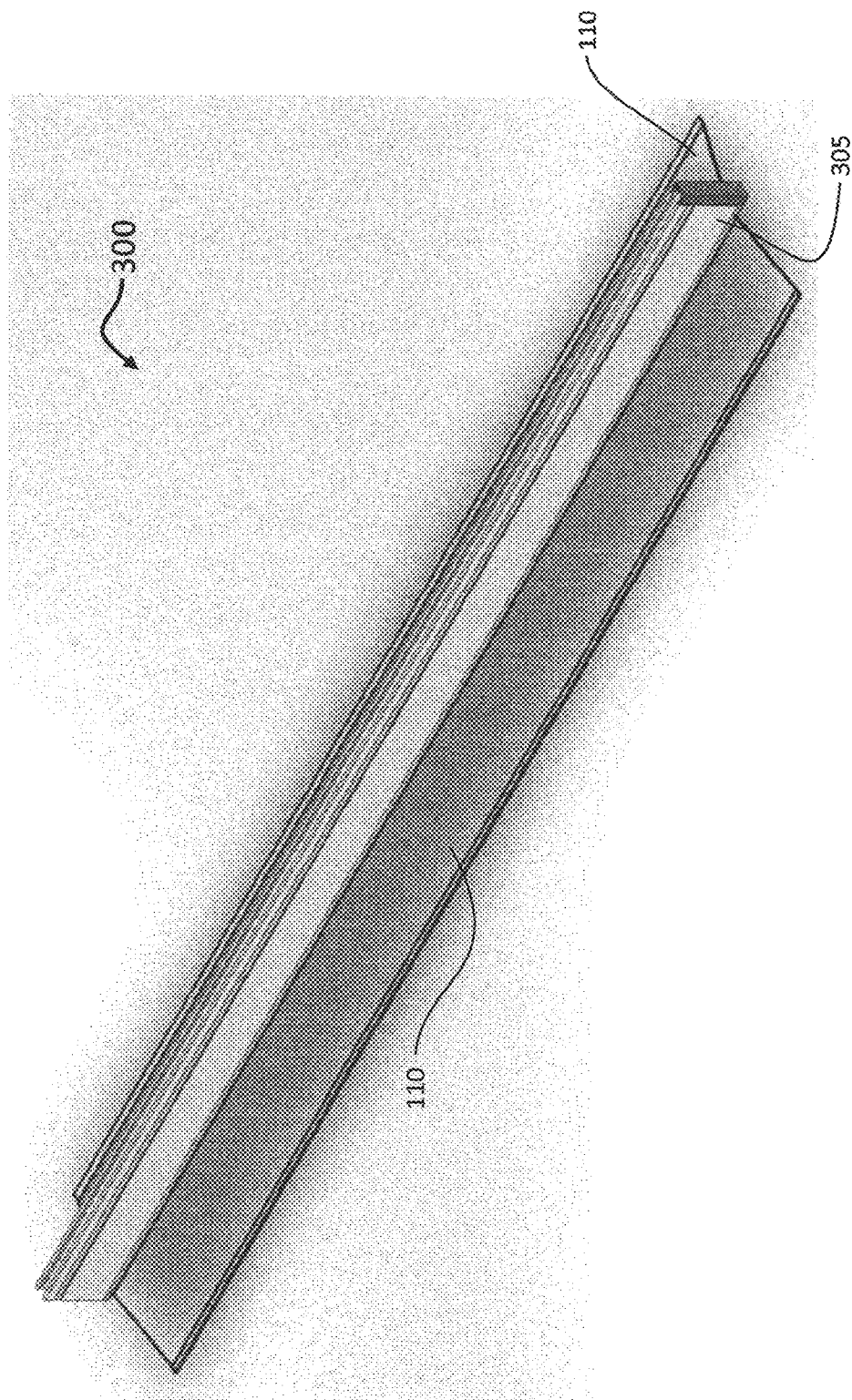
FIG. 3 is an illustration of an example luminaire that may comprise a lighting system as illustrated in FIGS. 1 and 2 in accordance with some embodiments of the disclosure.
Figure 4:
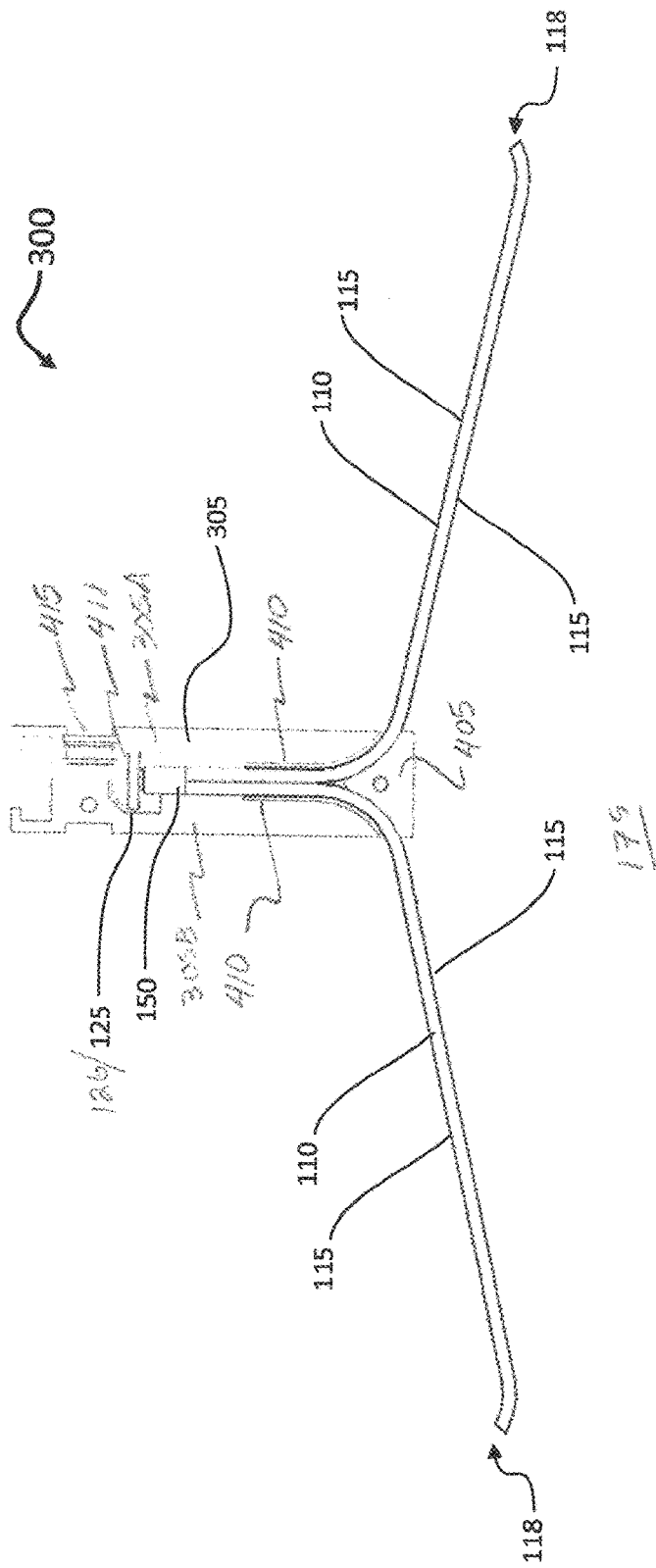
FIG. 4 is a cross sectional view of the example luminaire illustrated in FIG. 3 in accordance with some embodiments of the disclosure.

Turning now to FIGS. 3 and 4, these figures illustrate an example luminaire 300 incorporating a lighting system 100 that is configured in general accordance with the embodiment of FIGS. 1 and 2A. FIG. 3 illustrates a perspective view of the luminaire 300, while FIG. 4 illustrates a cross sectional view. In the example luminaire 300, a frame 305 supports the lighting system 100 and facilitates installation and mounting for example to provide overhead illumination.

In the example luminaire 300, the edges 118 of the lightguides 110 are bent upward. In this configuration, any residual light that propagates to the edges 118 of the lightguides 110 without being emitted from the major faces 115 of the lightguides 110 is directed upward. This feature can avoid visibility of glare or bright light to any persons present in the area 175 below the luminaire 300. In other words, light emitted from the edges 118 is cast upward and thus not directly visible to people occupying the area 175.

As illustrated, the frame 305 is in two pieces 305A, 305 that extend lengthwise along with the circuit board 126 and associated row of light emitting diodes 125, the optic 150, and the lightguides 110. The two pieces 305A, 305B can be joined together via one or more screws, rivets, brads, clamps, or other appropriate fasteners or via gluing, bonding, etc.

A lengthwise-extending recess in one side 305A of the frame 305 accommodates light emitting diode driver circuitry 415. The circuit board 126 is mounted to a horizontal platform 411 formed in the side 305A of the frame 305.

An end cap 405 is located below the bifurcation of the two lightguides 110. The frame 305 includes recessed areas that provide a gap 410 between the lightguides 110 and the frame sides 305A, 305B to avoid or control frame-to-lightguide contact that might interfere with total internal reflection of light flowing in the lightguides 110.

Figure 5A:
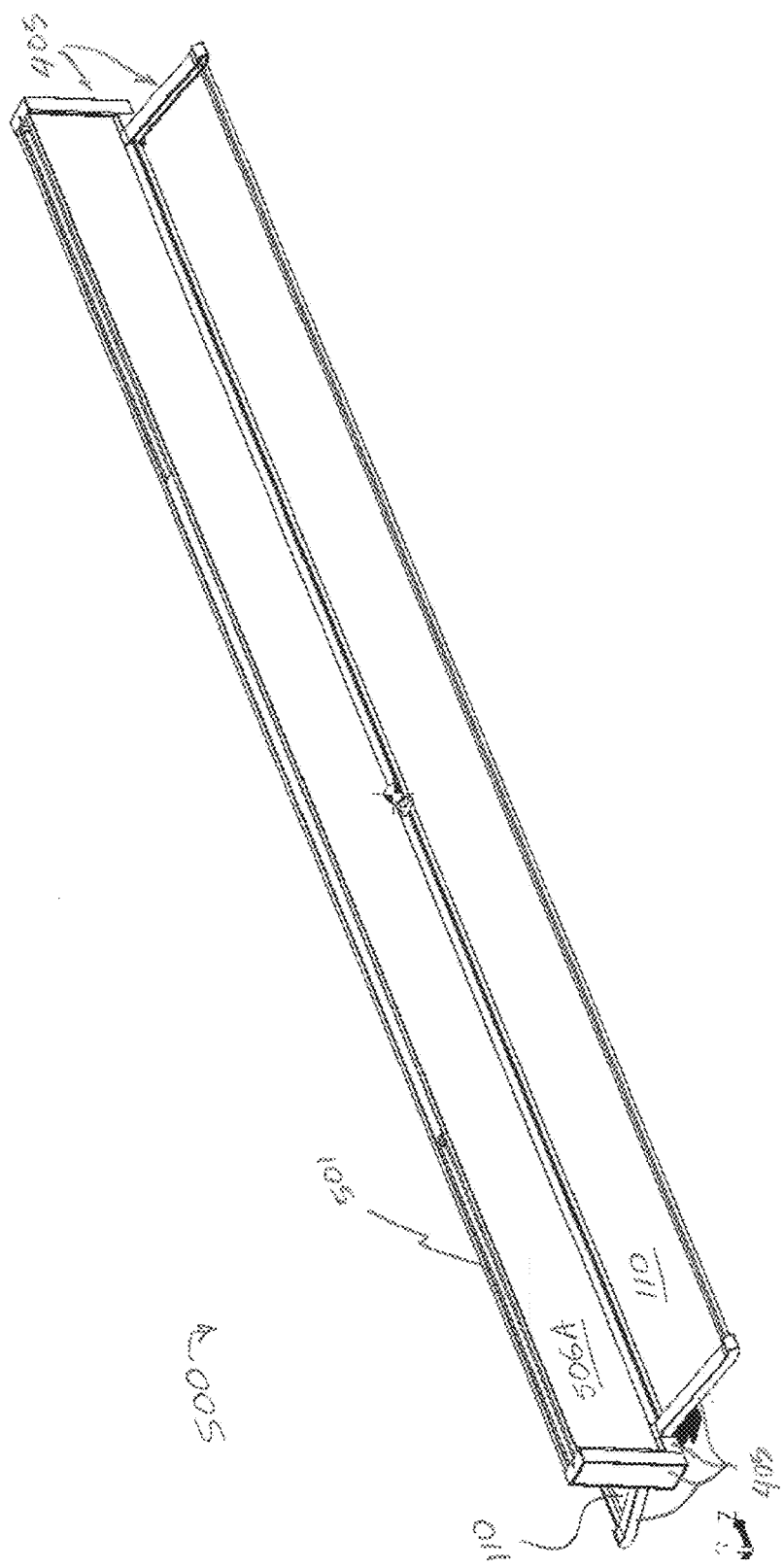

Turning now to FIGS. 5A, 5B and 5C, another example luminaire 500 is illustrated in accordance with some embodiments of the disclosure. FIG. 5A illustrates a perspective view of the luminaire 500. FIG. 5B illustrates a perspective cutaway view of the luminaire 500. FIG. 5C illustrates a perspective cutaway view of an internal frame 505 of the luminaire 500, with the circuit board 126 (and associated light emitting diodes 125) and the optic 150 mounted to the internal frame 505.

In the illustrated embodiment, the luminaire 500 comprises two end caps 405 at opposing ends of the lightguides 110. A top cap 510 and a bottom cap 406 extend between the end caps 405 and may be composed of plastic or other appropriate material. An internal frame 505, which is best seen in FIG. 5C, provides structural integrity and also extends between the end caps 510. Two side plates 506A, 506B snap to lengthwise-extending mating features in the internal frame 505. The internal frame 505 comprises a platform 411 to which the circuit board 126 and associated light emitting diodes 125 is mounted. In an example embodiment, the internal frame 505 holds the lightguides 110 and the optic 150 in place with clamping force while leaving a majority of the surface of the lightguides 110 free from contact to promote total internal reflection. Other embodiments may utilize bonding, fastening, or other appropriate means for holding the optic 150 and lightguide 110 in place.

Figure 6:
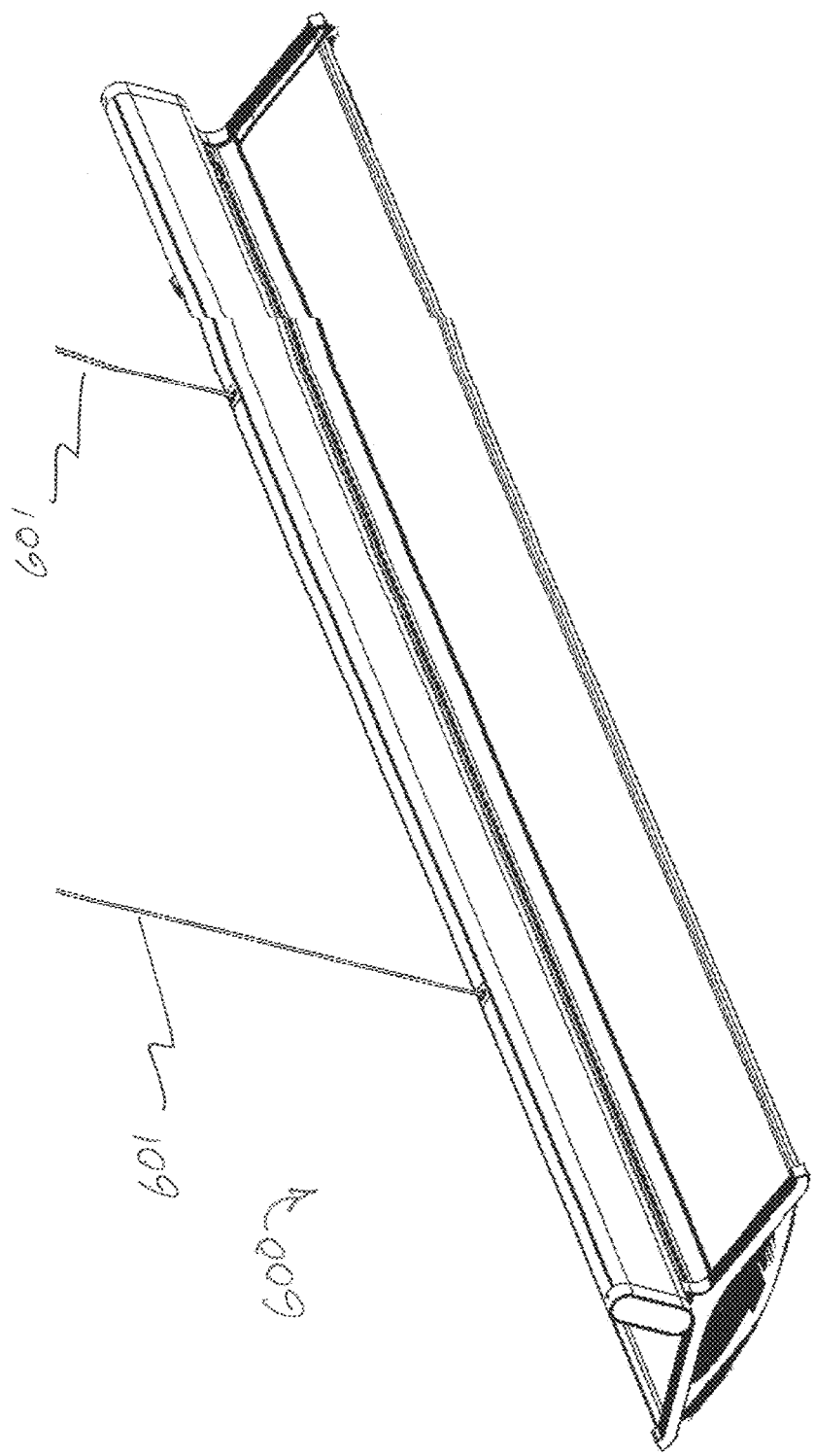
FIG. 6 is an illustration of another example luminaire that may comprise a lighting system as illustrated in FIGS. 1 and 2 in accordance with some embodiments of the disclosure.

FIG. 6 illustrates another example luminaire 600 in accordance with some embodiments of the disclosure. The luminaire 600 is configured similarly to the luminaire 500 illustrated in FIG. 5 and discussed above. However, the luminaire 600 comprises rounded edges. As illustrated in FIG. 6, the luminaire 600 further has attached wires 601 for suspending from a ceiling or other appropriate overhead structure.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A lighting system comprising:
   a plurality of lightguides, each lightguide comprising an edge for receiving output light, and a first major surface and a second major surface for emitting illumination light,
      wherein for each lightguide, the first major surface is disposed opposite to the second major surface such that a first portion of the illumination light exits the lightguide through the first major surface towards a first direction and a second portion of the illumination light exits the lightguide through the second major surface towards a second direction, the second direction being opposite to the first direction;
      wherein the plurality of lightguides are arranged such that at least a portion of the first major surfaces of two lightguides of the plurality of lightguides adjoin and define a joint;
   light emitting diodes that are arranged in a row; and
   an optic that is disposed between the row of the light emitting diodes and the edges of the two lightguides,
      wherein the optic comprises an entrance face that faces the light emitting diodes and is configured to receive emitted light, an exit face that faces the edges of the two lightguides and is configured to emit the output light, and a side face that extends between a perimeter of the entrance face and a perimeter of the exit face,
      wherein the side faces are polished for total internal reflection of the emitted light propagating between the entrance face and the exit face, and
      wherein the exit face comprises at least one of a patterned surface and particles concentrated thereon and is operative to manipulate and apportion the emitted light substantially equally as the output light between the two lightguides;
      when the row of light emitting diodes are positioned such that a plane defined by the joint between the at least a portion of the first major surfaces of the two lightguides passes through each light emitting diode of the row of the light emitting diodes, and
      when the row of the light emitting diodes are positioned such that the plane is laterally offset from and does not pass through each light emitting diode of the row of the light emitting diodes, and
         wherein a thickness of the optic is substantially equal to a combined thickness of the plurality of lightguides.

2. The lighting system of claim 1, wherein the optic comprises another lightguide.

3. The lighting system of claim 1, wherein the manipulation of the emitted light comprises diffusion of the emitted light passing through the exit surface of the optic for reception by the edges of the two lightguides.

4. The lighting system of claim 1, wherein the optic is operative to diffuse or blend the emitted light received from the row of the light emitting diodes.

5. The lighting system of claim 1, wherein the two lightguides comprise edgelit panels, and
   wherein the lighting system comprises a luminaire that is configured to be suspended and to generate both uplight and downlight.

6. The lighting system of claim 1, wherein a light emitting diode in the row of the light emitting diodes comprises a first surface through which the emitted light passes,
   wherein a chromaticity of the emitted light passing through the first surface varies across the first surface,
   wherein the optic comprises the exit surface facing the edges of the two lightguides that are adjoined,
   wherein the optic is operative to receive and process the emitted light passing through the first surface to emit the output light through the exit surface, and
   wherein a chromaticity variance of the output light across the exit surface is reduced relative to the chromaticity variance of the emitted light received by the optic from the first surface of the light emitting diode.

7. The lighting system of claim 1, wherein each lightguide of the two lightguides comprises a panel of optical material, and
   wherein the optic comprises a bar of material that transmits light therethrough.

8. A lighting system comprising:
   a frame that comprises:
      a recess configured to house a driver,
      a first elongate member, and
      a second elongate member,
         wherein the first elongate member and the second elongate member are coupled to each other along a first portion and define a horizontal platform and a lightguide receiving gap along a second portion;
   a circuit board that is mounted to the horizontal platform of the frame;
   a row of light emitting diodes that are mounted to the circuit board, the row of light emitting diodes extending in a direction;
   a first lightguide that is mounted to the frame adjacent the circuit board and within the lightguide receiving gap, the first lightguide extending lengthwise in the direction and positioned to receive emitted light from the row of light emitting diodes; and
   two second lightguides that are mounted to the frame and within the lightguide receiving gap, wherein the two second lightguides extend lengthwise in the direction, wherein the two second lightguides are disposed adjacent the lightguide and are oriented to receive output light from the first lightguide at a first edge of the two second lightguides, wherein each second lightguide comprises a first major surface, a second major surface disposed opposite to the first major surface, the first edge, and a second edge that is opposite to the first edge, wherein the first major surface and the second major surface of each second lightguide are arranged such that: a first portion of the output light that enters the first edge of the second lightguide exits the second lightguide via the first major surface towards a first direction to provide a downlight, and a second portion of the output light exits the second lightguide via the second major surface towards a second direction to provide an uplight, and wherein the second edge of each second lightguide is curved towards the second direction such that a third portion of the output light that enters the second lightguide via the first edge thereof exits the second lightguide via the second edge towards the second direction, wherein the first lightguide is disposed between the row of light emitting diodes and the two second lightguides and configured to apportion the emitted light received from the row of light emitting diodes substantially equally among the two second lightguides as the output light provided to the two second lightguides, and wherein a thickness of the first lightguide is substantially equal to a combined thickness of the two second lightguides among which the emitted light is apportioned.

9. The lighting system of claim 8, wherein the lighting system comprises a luminaire that is configured to be suspension mounted.

10. A lighting system comprising:
a number of rows of light emitting diodes, wherein at least one light emitting diode of the number of rows of light emitting diodes produces emitted light through a first surface region;
an optic comprising:
  a first major surface that defines a first plane and a second major surface disposed opposite to the first major surface, the second major surface defining a second plane that is substantially parallel to the first plane,
  a first edge disposed between a first end of the first major surface and a first end of the second major surface and oriented to receive the emitted light that the at least one light emitting diode emits through the first surface region; and
  a second edge opposite the first edge and disposed between a second opposite end of the first major surface and a second opposite end of the second major surface, the second edge comprising a second surface region that emits output light; and
a number of lightguide panels, each lightguide panel comprising an edge oriented to receive the output light emitted through the second surface region of the optic,
wherein the number of lightguide panels are adjoined at adjacent major surfaces of the lightguide panels,
wherein the number of the rows of light emitted diodes comprises at least one row of light emitting diodes and the number of the rows of light emitting diodes is less than the number of lightguide panels,
wherein the rows of light emitting diodes are positioned between the first plane and the second plane of the optic,
wherein a thickness of the optic measured from the first major surface to the second major surface is substantially equal to a thickness of the number of lightguide panels, and
wherein the first major surface and the second major surface of the optic are polished for total internal reflection of emitted light propagating between the first edge and the second edge, and
wherein the second edge of the optic comprises at least one of a patterned surface and particles concentrated thereon and is operative to apportion the emitted light substantially equally among the lightguide panels as the output light that is provided to the lightguide panels.

11. The lighting system of claim 10, wherein the optic is operative to mix light produced by the rows of light emitting diodes.

12. The lighting system of claim 10, wherein the optic is operative to diffuse light passing through the optic.

13. The lighting system of claim 10, wherein the number of lightguide panels is at least two lightguide panels.

14. The lighting system of claim 10:
wherein a first chromaticity of the emitted light through the first surface region varies across the first surface region, and
wherein a second chromaticity of the output light emitted from the second surface region is substantially more uniform than the first chromaticity of the emitted light through the first surface region.

* * * * *